March 31, 1970 A. J. GRANT 3,504,284
ELECTRICAL MEASURING APPARATUS INCLUDING A BRIDGE CIRCUIT
AND A METER HAVING A ROTOR AND THREE POLE STATOR
Filed Aug. 29, 1963 2 Sheets-Sheet 1
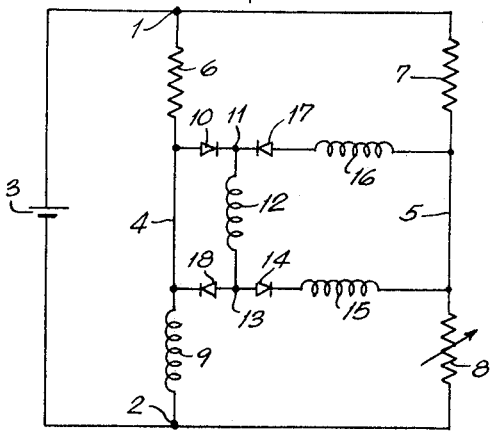
Fig. 1.
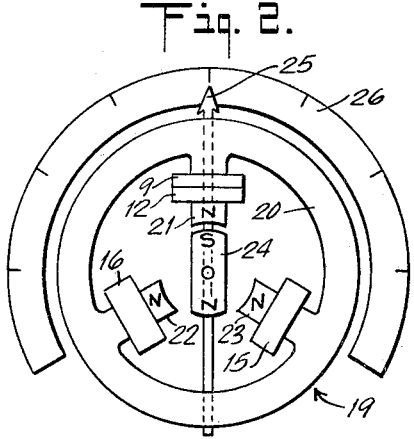
Fig. 2.
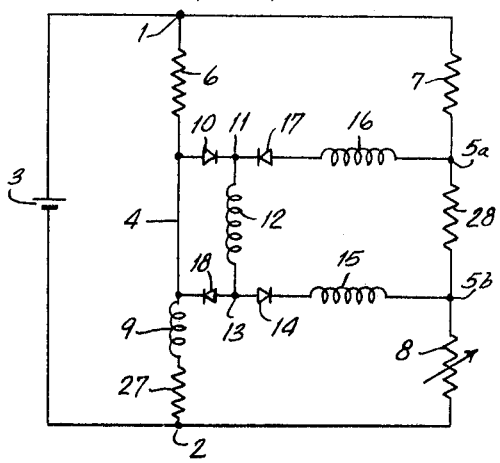
Fig. 3.
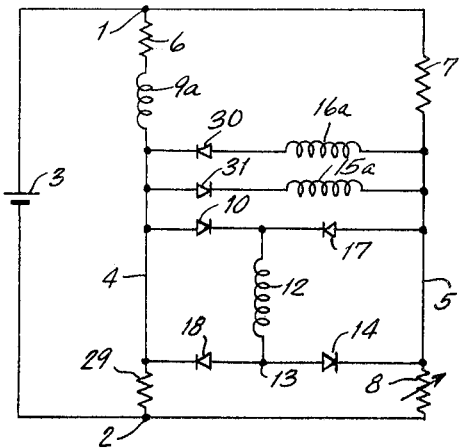
Fig. 4.
Fig. 5.
INVENTOR.
ALEXANDER J. GRANT
BY
Lester W. Clark
ATTORNEY

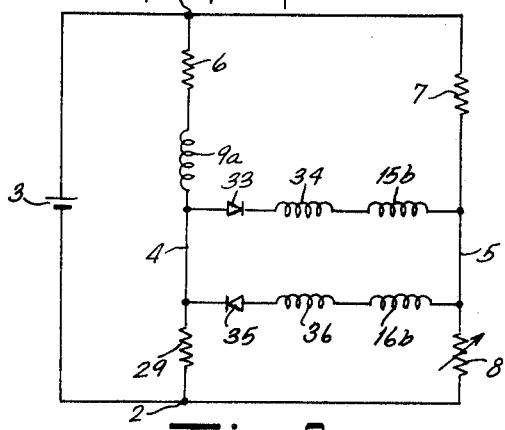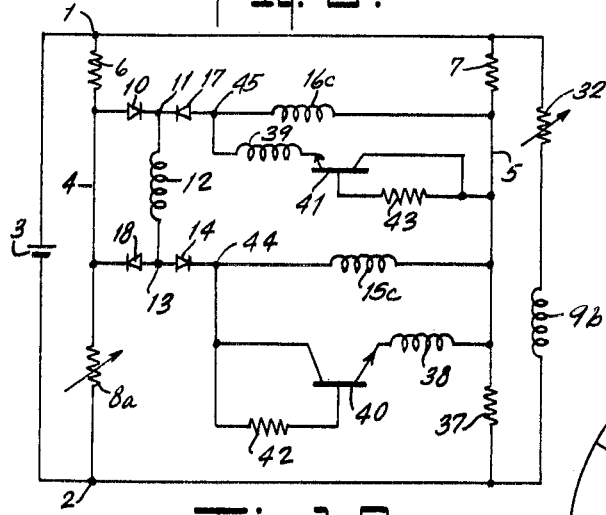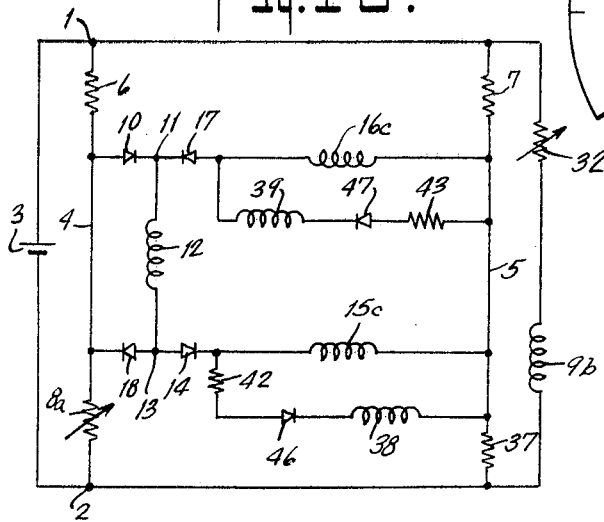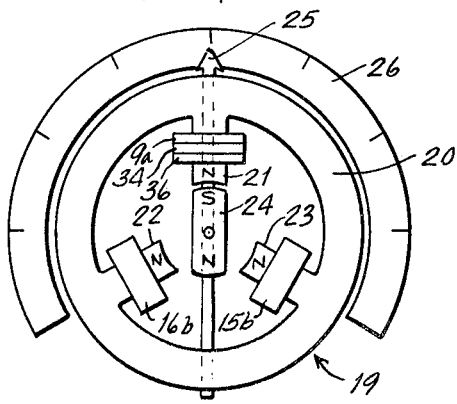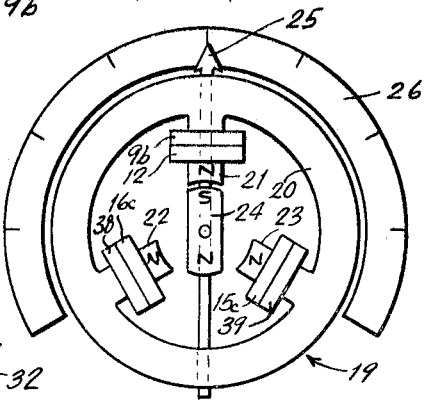

United States Patent Office 3,504,284
Patented Mar. 31, 1970

3,504,284
ELECTRICAL MEASURING APPARATUS INCLUD-
ING A BRIDGE CIRCUIT AND A METER
HAVING A ROTOR AND THREE POLE STATOR
Alexander J. Grant, Central Islip, N.Y., assignor, by
mesne assignments, to Simmonds Precision Products,
Inc., a corporation of New York
Filed Aug. 29, 1963, Ser. No. 305,388
Int. Cl. G01r 7/00, 17/10, 27/02
U.S. Cl. 324—140                         15 Claims

ABSTRACT OF THE DISCLOSURE

Electrical measuring apparatus including an indicator having a rotor which has north and south poles. A stator having three circumferentially spaced poles is included with windings thereon that are part of a bridge circuit. A first winding on a first one of the stator poles is connected in the bridge circuit so as to be energized under all conditions of balance or unbalance of the bridge circuit. A second or bucking winding on the first stator pole opposes the first winding and is energized in the same sense under either condition of unbalance of the bridge circuit. Third and fourth windings are respectively included on the second and third stator poles and connected in the bridge circuit so that one of the windings is energized only upon unbalance of the bridge in one of its opposed senses and the other winding is energized only upon unbalance of the bridge in the other of its opposed senses.

The energization of the windings may be achieved by employing a bridge circuit having a variable resistor to unbalance the bridge in which the first winding is in a common leg and continuously energized regardless of unbalance of the bridge. The second winding is included in a common leg of a diode network in which the third and fourth windings form legs including diodes therein to limit the flow of current so that only one of the third and fourth windings is energized when the bridge is unbalanced.

Various diode networks may be employed with diode configurations so as to provide the required current flow through the windings.

The second or bucking winding may be formed from two separate windings, one of which is energized upon unbalance of the bridge in one sense, and the other of which is energized upon unbalance of the bridge in the other of its senses.

The second and third stator poles may respectively include fifth and sixth additional windings thereon. The third and fourth windings on these stator poles are energized alternatively as described above. Additionally, the fifth winding on the second stator pole is energized when the current through the fourth winding on the third stator pole exceeds a certain amount; likewise the sixth winding on the third stator pole is energized when the current through the third winding on the second stator pole exceeds a certain amount. The alternative flows of currents through the fifth and sixth windings, dependent upon the flows of current respectively through the fourth and third stator windings, may be controlled by transistors or diodes, for example.

Electrical measuring apparatus including a bridge circuit that has two output terminals connected by an output network having two current paths between the output terminals. Each current path has a diode and an output winding therein, the diode in one path being connected with its polarity opposite to that of the diode in the other path with respect to the output terminals.

The present invention relates to electrical measuring apparatus, and particularly to the combination of a novel electrical bridge circuit and a novel meter structure cooperating with the bridge circuit to provide a deflection of the meter pointer over an extended angular range in response to variation of electrical conditions in the bridge circuit.

In the illustrated embodiments of the invention, the meter is of a zero center type, the pointer being at the middle of its associated scale when the bridge is balanced and deflecting in one direction from that center position upon unbalance of the bridge in one sense and in the other direction upon unbalance of the bridge in the opposite sense. In most of the modifications described herein, the pointer has a total angular range of deflection from one end of its scale to the other of approximately 270°. In some modifications, the total angular range of deflection of the pointer is approximately 300°. These wide ranges of deflection provide improved accuracy and ease of reading as compared to prior art electrical measuring apparatus.

An object of the invention is to provide an improved electrical bridge circuit and meter combination.

A further object is to provide such an improved combination, in which the pointer of the meter is swung through a larger total angle than has heretofore been possible.

Another object is to provide an improved bridge circuit for use in such a combination.

Another object is to provide an improved meter for use in apparatus of the type described.

The foregoing and other objects of the invention are attained in the apparatus described herein, in which the meter includes a magnetic stator structure having three poles spaced 120° apart and cooperating with a permanent magnet rotor which drives the pointer and which has two diametrically opposed poles. One of the three stator poles serves as the center pole and carries two windings, one of which is connected in the bridge circuit so as to be continuously energized at all times when the bridge circuit is energized. The second of the two center pole windings is connected in the bridge circuit so as to be energized only when the bridge circuit is unbalanced, but is energized in the same sense in either direction of unbalance of the bridge circuit, and thus tends to weaken, or buck, the magnetic field of the first winding whenever the bridge is unbalanced. The second and third poles of the meter each carry windings which are so connected in the bridge circuit as to be energized upon one sense of unbalance only in the bridge circuit, and which, when energized, create in the second and third poles flux of the same polarity as that established by the continuously energized winding on the center pole.

When the bridge is balanced, there is no current in the windings on the second and third poles, nor in the bucking winding on the center pole. Consequently, one pole of the rotor seeks a position of alignment with the center pole, the particular rotor pole being determined by the polarity of the pole established by the continuously energized winding on the center pole.

When the bridge is unbalanced in one direction, the winding on the second pole has current flowing through it and the magnetic field on the center pole is decreased so that the one pole on the rotor which was aligned with the center pole now moves toward the second pole. When the ampere-turns on the bucking winding equals the ampere-turns on the continuously energized winding on the center pole, that pole has no effect on the rotor, and the one pole of the rotor is then directly aligned with the second pole, having moved 120° from its balanced-bridge position. If the bridge is now further unbalanced, the ampere-turns on the bucking winding on the center pole becomes still larger, resulting in the polarity of the center pole reversing, and consequently the other pole of the rotor (then located 60° away from the center pole) is drawn towards the center pole, rotating the rotor still further in the same direction.

On the other hand, when the bridge is unbalanced in the opposite sense, the winding on the third stator pole receives current and the one pole on the rotor moves toward the third stator pole. The magnetic field of the center pole is again decreased at the same time by the action of the bucking winding on that pole. Again, if the bridge is sufficiently unbalanced, the one pole of the rotor may be driven past the third pole. An angular range of pointer rotation of about 270° is secured.

Some of the modifications described are more complex, and have additional windings and circuitry for the securing of additional advantages, including an even wider range of pointer rotation.

Other objects and advantages of the invention will become apparent from a consideration of the following specification and claims, taken together with the accompanying drawings.

In the drawings:

FIG. 1 is a wiring diagram of a bridge circuit employed in one embodiment of the invention;

FIG. 2 is a somewhat diagrammatic illustration of the magnetic structure of a meter used in connection with the bridge circuit of FIG. 1;

FIGS. 3, 4 and 5 are wiring diagrams of three alternative forms of bridge circuits embodying the invention and which may be used with the meter structure of FIG. 2;

FIG. 6 is a wiring diagram of another embodiment of the invention;

FIG. 7 is a diagrammatic illustration similar to FIG. 2 of a meter suitable for use with the bridge circuit of FIG. 6;

FIG. 8 is a wiring diagram of still another bridge circuit embodying the invention;

FIG. 9 is a diagrammatic illustration of a meter suitable for use with the bridge circuit of FIG. 8; and FIG. 10 is a wiring diagram of an alternative form of bridge circuit embodying the invention and which may be used with the meter structure of FIG. 9.

FIGS. 1-2

FIG. 1 shows an electrical bridge circuit including input terminals 1 and 2 connected to the opposite terminals of a direct current power supply shown as a battery 3, and output terminals 4 and 5, each shown for convenience as a wire connecting two junctions. A resistor 6 is connected between input terminal 1 and output terminal 4. A resistor 7 is connected between input terminal 1 and output terminal 5. A variable resistor 8 is connected between output terminal 5 and input terminal 2. An electrical coil winding 9 is connected between output terminal 4 and input terminal 2. The variable resistor 8 may be varied in response to any desired variable condition, for example, the level of liquid in a tank, by any conventional means. Alternatively, it may be a resistor element whose resistance changes with temperature.

Between the output terminals 4 and 5 is connected an output network. One branch of the output network conducts current from terminal 4 to terminal 5 and may be traced from terminal 4, through diode 10, a junction 11, a winding 12, a junction 13, a second diode 14, and a winding 15 to output terminal 5. Both diodes 10 and 14 are connected to conduct current in the direction from terminal 4 to terminal 5 and to block any current flow in the opposite direction.

Another branch of the output network conducts current from terminal 5 to terminal 4, and may be traced from output terminal 5 through a winding 16, a diode 17, junction 11, winding 12, junction 13, and a diode 18 to the output terminal 4. Both diodes 17 and 18 are connected to conduct current in the direction from terminal 5 to terminal 4, and to block any current flow in the opposite direction.

Note, however, that any current flowing between terminals 4 and 5 in either direction passes through winding 12 and always in the same direction.

The bridge circuit of FIG. 1 operates a meter illustrated in FIG. 2. The meter includes a stator 19 having an annular portion 20 and three radially inwardly projecting poles 21, 22 and 23, spaced substantially 120° apart. The pole 21 carries the winding 9 and the winding 12, hereinafter sometimes referred to as the bucking winding. Pole 22 carries the winding 16. Pole 23 carries the winding 15.

A rotor 24 has two diametrically opposite poles, and is permanently magnetized with the polarity indicated in the drawing. The rotor 24 is suitably journaled and carries a pointer 25 which cooperates with a stationary scale 26. Alternatively, the pointer may be connected to the rotor through suitable gearing of any desired ratio.

OPERATION OF FIGS. 1-2

When the bridge circuit is balanced, the output terminals 4 and 5 are at the same potential, and no current is flowing in the output network. Consequently, the only one of the four windings 9, 12, 15 and 16 which is carrying current is the winding 9. Winding 9 is so wound that the center pole 21 is magnetically energized as a north pole, and attracts the south pole on the rotor 24, with the result that the pointer 25 is at the center of the scale 26.

Assume now that the resistance 8 is increased from its value in the balanced condition just described. The potential of output terminal 5 is therefore raised and current flows in the output network from the junction 5 through winding 16, diode 17, bucking winding 12, and diode 18 to output terminal 4. The effect of any increase in the current flow through the winding 9 is cancelled by the effect of the current flowing through the bucking winding 12. The winding 12 may be, and in fact is preferably so wound that its effect more than cancels the effect of the increase in current in the winding 9, thereby weakening the magnetic field in the pole 21. The energization of winding 16 causes the pole 22 to repel the north pole and attract the south pole on the rotor 24, thereby turning the rotor counterclockwise from the position shown in FIG. 2. If unbalance of the bridge in the same sense continues until the ampere-turns in winding 12 equals the ampere-turns in winding 9, then the rotor 24 turns through 120° counterclockwise from the position shown until its south pole is substantially aligned with the pole 22. If the unbalance is increased still more, so that the ampere-turns in winding 12 is greater than the ampere-turns in winding 9, then pole 21 becomes a south pole and attracts the north pole of the rotor, thereby turning the rotor further counterclockwise and producing a total counterclockwise rotation of more than 120° from the bridge-balanced position. Angular rotations as high as 135° have been obtained.

Return now to the condition of balance of the bridge circuit, and assume that it becomes unbalanced due to a decrease in resistance of resistor 8. The potential of output terminal 5 then falls with respect to the potential of terminal 4 and current flows through the output network from terminal 4 through diode 10, bucking winding 12, diode 14 and winding 15 to the output terminal 5. Note that this robs some current from the continuously energized winding 9. Note also that the current flow through the bucking winding 12 is in the same direction as it was when the bridge was unbalanced in the opposite sense. The effect of the current flowing through winding 12 and the decrease in current flow through winding 9 is to reduce the magnetic field in pole 21. The current flow in coil 15 increases the magnetic field in pole 23. No current is at this time flowing in coil 16. The pole 23 repels the north pole and attracts the south pole on the rotor 24, thereby rotating it clockwise from the center position shown in FIG. 2. If unbalance of the bridge in the same sense continues sufficiently, then the south pole on rotor 24 becomes aligned with the pole 23, with a resultant rotation of the pointer 25 clockwise 120° from the center position shown. Further unbalance causes the pointer to continue its clockwise travel beyond the 120° position, in a manner analogous to the counterclockwise condition described above. It will thus be apparent that with the bridge circuit of FIG. 1 and the meter of FIG. 2, there can be produced a total pointer rotation of approximately 270° with respect to the scale 26, in response to a shift of the bridge circuit from a condition of maximum unbalance in one sense to a condition of maximum unbalance in the opposite sense. The sensitivity of the pointer indication is thereby increased as compared to electrical measuring apparatus of the prior art, and the ease of observing the pointer indication is also increased.

It should be understood that increasing the range of pointer rotation has the effect of increasing the nonlinearity of response, i.e., the relation between the potential across the output terminals 4 and 5 and the pointer deflection. For example, if the pointer rotation is limited to 240°, the maximum nonlinearity (maximum departure from a linear relation) may be held within 5%. On the other hand, if the range of pointer rotation is extended to 270°, the maximum nonlinearity may go as high as 10%.

The nonlinearity may be controlled to expand part of the scale and contract other parts. For example, either the upper half, the lower half, or the middle half of the scale may be expanded at the expense of contracting other parts of the scale, by selecting appropriate resistance values for various parts of the bridge, in a manner generally known in the art.

FIG. 3

This figure illustrates a presently preferred modification of the bridge circuit of FIG. 1. This bridge circuit may be used with the meter of FIG. 2. Those elements in FIG. 3 which are the same as their counterparts in FIG. 1 have been given the same reference numerals, and will not be further described.

One difference between the circuit of FIG. 3 and the circuit of FIG. 1 is the addition of a resistor 27 in series with coil 9 in order to obtain the desired resistance in the leg of the bridge between 4 and 2.

The only other difference is that the output terminal 5 has been replaced in FIG. 3 by an arrangement which may be defined as split output terminals 5a and 5b. A resistor 28 connects terminals 5a and 5b. The function of resistor 28 is to eliminate an insensitivity of the bridge circuit of FIG. 1 to small changes in resistor 8 when the bridge circuit is near balance. This insensitivity occurs in the circuit of FIG. 1 when the voltage difference between terminals 4 and 5 is below the threshold potentials of the pair of diodes 10 and 14, or the pair of diodes 17 and 18. Resistance value of 28 can be selected so when the bridge is balanced, the voltage drop between terminals 4 and 5b equals the threshold potential of diodes 10 and 14, and the voltage drop between terminals 5a and 4 equals the threshold potential of diodes 17 and 18. Any increase in resistor 8 then causes current to flow through windings 16 and 12, and any decrease in resistor 8 causes current to flow through windings 12 and 15. In either case, there is an immediate change in the magnetic forces acting on the rotor.

The following table shows the battery potential, resistance values for each resistor and winding, and type numbers for each diode, in one successfully operated embodiment of the circuit of FIG. 3:

TABLE A

Battery 3—28 volts
Resistor 6—300 ohms
Resistor 7—270 ohms
Resistor 8—44–3700 ohms
Winding 9—109 ohms
Diodes 10, 14, 17, 18—Type 1N139
Winding 12—285 ohms
Winding 15—93 ohms
Winding 16—140 ohms
Resistor 28—30 ohms
Resistor 27—111 ohms

FIG. 4

This wiring diagram illustrates a circuit which is the equivalent of that shown in FIG. 1, except that the output network is somewhat more complex and requires two more diodes. Furthermore, the location of the continuously energized winding is changed from that shown at 9 in FIGS. 1 and 3.

Those elements in FIG. 4 which are the same in structure and function as their counterparts in FIG. 1 have been given the same reference numerals and will not be further described.

In FIG. 4, the winding 9 has been moved to a location shown at 9a in series with the resistor 6. The location occupied by the winding 9 in FIG. 1 is occupied in FIG. 4 by a fixed resistor 29. The output windings 15 and 16 have been moved to new locations shown at 15a and 16a in FIG. 4. The output network of the bridge circuit now has two more branches, one including the winding 16a and a diode 30, the other including winding 15a and a diode 31.

The functioning of the bridge circuit of FIG. 4 is substantially the same under conditions of balance or unbalance as the functioning of the circuit of FIG. 1. It is considered that further description is not necessary.

FIG. 5

This circuit differs from the circuit shown in FIG. 4 in that the continuously energized coil is now connected at 9b in a separate parallel branch between the input terminals 1 and 2. That branch includes in series the continuously energized coil 9b and a variable resistor 32.

Other elements of the circuit of FIG. 5 have been given the same reference numerals as the corresponding elements in FIGS. 1 and 4 and will not be further described. The operation of this circuit is essentially the same as the operation of the circuits of FIGS. 1 and 4. Increasing the value of resistor 32 will decrease the strength of coil 9b, and lengthen the range of pointer travel, while decreasing the value of 32 will shorten the range of pointer travel. Similarly, use of variable resistors in place of fixed resistors 6, 7 or 29 will provide selective control of the pointer travel in various parts of its range of movement.

FIGS. 6–7

The circuit shown in FIG. 6 is modified as compared to the circuit shown in FIG. 1 by a change in the location of the continuousyl energized winding 9, being that corresponding to the winding 9a of FIG. 4. The output network in FIG. 6 is considerably modified from that shown in FIG. 1, and consists only of two parallel branches. One branch may be traced from output terminal 4 through a diode 33, a bucking winding 34, and an output winding 15b to output terminal 5. The other branch of the output network may be traced from output terminal 4 through an output winding 16b, a bucking winding 36 and a diode 35 to terminal 5.

In the meter of FIG. 7, the pole 21 carries the continuously energized winding 9a and both the bucking windings 34 and 36. The meter is otherwise the same as the meter of FIG. 2.

When the bridge circuit of FIG. 6 is balanced, the operation is the same as the bridge circuit of FIG. 1 under balanced conditions. When the circuit of FIG. 6 is unbalanced in one direction, the bucking winding 34 and the output winding 15b are energized. When the bridge circuit is unbalanced in the opposite sense, the bucking winding 36 and the winding 16b are energized. The circuit of FIG. 6 has an advantage over the circuit of FIG. 1 in that two less diodes are required, but is more complex than the circuit of FIG. 1 in that two bucking windings 34 and 36 are required to perform the function performed in FIG. 1 by the single bucking winding 12.

FIGS. 8–9

The circiut of FIG. 8 and the cooperating meter of FIG. 9 embody further modifications of the invention by which the range of angular movement of the pointer may be extended to about 300°.

This circuit includes four output windings while the circuits described above had only two. The two additional windings are shown at 38 and 39, and are mounted on the poles 22 and 23 of the stator 19. Energization of windings 38 and 39 is controlled respectively by transistors 40 and 41.

It will be readily understood by those skilled in the art that equivalent devices, e.g., vacuum tubes or relays, may be used to perform functions corresponding to those of transistors 40 and 41. Note also the circuit of FIG. 10, described below, in which diodes perform a corresponding function. It will also be understood that any of several types of transistors are suitable and that they may be connected to the bridge circuit in any of several ways to perform equivalent functions.

Those elements in FIGS. 8 and 9 having the same structure and function as their counterparts in previous figures have been given the same reference numerals and will not be further described. In FIG. 8, the variable resistance 8 has been moved to a new location 8a between the output terminal 4 and input terminal 2. Its former location is occupied by a fixed resistor 37. Each of the poles 22 and 23 of FIG. 9 carries two windings. Pole 22 carries a winding 16c which corresponds generally to the winding 16 of FIG. 1 and another winding 38, which has no counterpart in FIG. 1. Pole 23 likewise carries a winding 15c corresponding generally to winding 15 of FIG. 1 and another winding 39 having no counterpart in FIG. 1.

The output network of FIG. 8 differs from that of FIG. 1 by the inclusion of the windings 38 and 39, two transistors 40 and 41 and two resistors 42 and 43. Transistor 40 controls the current flow through the winding 38. Transistor 40 is of the NPN type and has its collector connected to the common junction 44 of winding 15a and diode 14. The base of transistor 40 is connected through resistor 42 to the same common junction 44. The emitter of transistor 40 is connected to one terminal of the winding 38, whose opposite terminal is connected to the output terminal 5.

Transistor 41 controls the current flow through winding 39. The collector of transistor 41 is connected to output terminal 5. The base of transistor 41 is connected through resistor 43 to the output terminal 5. The emitter of transistor 41 is connected to one terminal of winding 39, whose opposite terminal is connected to the common junction 45 of winding 16c and diode 17. Transistor 41 is also of the NPN type.

A transistor such as 40 and 41, when connected as illustrated, acts as a diode with a controllable threshold potential. Each transistor and an associated resistor are connected as a two-terminal network. The resistor in each case is connected between the base and collector of the transistor. The emitter and the collector of the transistor serve as the two terminals of the network. When a transistor is so connected, it conducts only a negligible current when the potential across the network is less than a threshold value, which may be selected by selecting the resistance of the resistor in the network. After the potential exceeds that threshold value, the current through the emitter-collector circuit of the transistor increases substantially linearly with further increases in the potential across the network.

The operation of the circuit of FIG. 8 and the meter of FIG. 9 is the same under balanced conditions of the bridge circuit as the operation of the circuit of FIG. 1. Under conditions of small unbalance of the bridge circuit, the operation remains the same as that of the circuit of FIG. 1. For example, consider a small unbalance of the bridge circuit in a sense that current flows in the output network from terminal 4 through diode 10, bucking winding 12, diode 14 and winding 15c to output terminal 5. As long as the potential drop across winding 15c remains small, transistor 40 passes negligible current through winding 38. Consequently, the pointer is rotated clockwise to bring the south pole of rotor 24 toward the pole 23. Further increase in current through winding 15c serves both to increase the potential drop between the collector and emitter of transistor 40, and to increase its base current supplied through resistor 42. Selection of the value of resistor 42 determines the unbalance potential at which transistor 40 starts to conduct substantial current through winding 38. Winding 38 is connected so that it magnetizes pole 22 with a north pole at its radially inner end. The value of resistor 42 should be selected so that a substantial current begins to flow in coil 38 only after the north pole of rotor 24 has passed by it, moving clockwise. The north pole established by coil 38 serves to repel the rotor north pole, causing the pointer to travel further clockwise. Greater unbalance increases the energization of coil 38, and it can be made to rotate the rotor 24 far enough to bring its south pole substantially past pole 23.

In a similar fashion, when the bridge is unbalanced in the opposite sense, the transistor 41 becomes effective to pass current through the winding 39 and rotate the south pole of rotor 24 in a counterclockwise direction beyond the pole 22. A total pointer travel of 300° may be readily obtained.

FIG. 10

The circuit of FIG. 10 is intended for use with the meter of FIG. 9. This circuit is similar to the circuit of FIG. 8, except that the transistors 40 and 41 of FIG. 8 are replaced in FIG. 10 by diodes 46 and 47, respectively. Those elements in FIG. 10 which are the same as their counterparts in FIG. 8 have been given the same reference numerals, and will not be further described.

Diodes such as 46 and 47 are considerably cheaper than the transistors 40 and 41 of FIG. 8. They also possess a threshold potential for current flow in the forward direction, and thus may be made to perform the function of the transistors in FIG. 8. However, the threshold values of commercial production diodes vary quite widely from one to another, as compared to the permissible tolerances in this circuit, so that careful individual selection of diodes may be required. Furtermore, the threshold potentials needed in this circuit may be quite high as compared to the thresholds of conventional diodes, so that it may be necessary to use two or more diodes in series in place of each of the diodes 46 and 47. Also, the diode threshold potentials are much less affected by the resistances of the resistors 42 and 43 connected in series with them, so that the thresholds cannot be as readily controlled in that manner as the transistor thresholds of FIG. 8.

It is believed that the structure and operation of FIG. 10 is otherwise so closely similar to that of FIG. 8 as to require no further discussion.

The various locations illustrated for the continuously energized winding 9, 9a and 9b are not necessarily specific to the particular circuits in which they are shown. Generally speaking, the continuously energized winding could be in any one of these locations for any of the circuits. Similarly, the variable resistor 8 could be interchanged with either of the resistors 6 and 7 or with the resistor 29.

While I have shown and described certain preferred embodiments of my invention, other modifications thereof will readily occur to those skilled in the art and I therefore intend my invention to be limited only by the appended claims.

I claim:

1. Electrical measuring apparatus, comprising:
   (a) indicator means including a relatively movable scale means and pointer means;
   (b) driving means for the indicator means including a rotor having at least one pole and a cooperating stator having at least three circumferentially spaced poles;
   (c) electrical circuit means controlling said driving means including:
      (1) a bridge circuit including variable means operable to unbalance the bridge in either of two opposed senses;
      (2) first winding means on a first one of the three stator poles and connected in the electrical circuit means so as to be energized under all conditions of balance or unbalance of the bridge circuit;
      (3) second winding means on said first stator pole and opposing the first winding means, said second winding means being connected in the bridge circuit so as to be energized in the same sense under either condition of unbalance of the bridge circuit; and
      (4) third and fourth winding means respectively on the second and third stator poles and connected in the bridge circuit so that said third winding means is energized only upon unbalance of the bridge in one of said opposed senses and said fourth winding means is energized only upon unbalance of the bridge in the other of said opposed senses.

2. Electrical measuring apparatus as defined in claim 1, in which said bridge circuit includes:
   (a) a pair of input terminals;
   (b) a pair of output terminals;
   (c) an output network connecting said output terminals;
   (d) said output network including two paths between said output terminals, each of said paths including at least one diode, the diode in one path being connected with its polarity opposite to that of the diode in the other path with respect to said output terminals.

3. Elecrical measuring apparatus as defined in claim 1, in which said bridge circuit includes a pair of input terminals, and said first winding means is connected between said input terminals.

4. Electrical measuring apparatus as defined in claim 1, in which said bridge circuit includes:
   (a) a pair of input terminals;
   (b) a pair of output terminals;
   (c) four arms connecting each of the two input terminals to each of the two output terminals; and
   (d) said first winding means is connected in one arm of the bridge.

5. Electrical measuring apparatus as defined in claim 1, in which said bridge circuit includes:
   (a) a pair of input terminals;
   (b) a pair of output terminals;
   (c) an output network connected between said output terminals and including said second winding means;
   (d) a first diode connecting one terminal of said second winding means to one of said output terminals;
   (e) a second diode connecting the other terminal of said second winding means to the other output terminal and poled in the same sense with respect to said output terminals as the first diode;
   (f) a third diode connecting said one terminal of said second winding means to the other output terminal and poled in the opposite sense to said first diode with respect to said output terminals; and
   (g) a fourth diode connected between said other terminal of said second winding means and said one output terminal and poled in the same sense as said third diode.

6. Electrical measuring apparatus as defined in claim 1, in which:
   (a) said second winding means comprises two separate windings;
   (b) said bridge circuit includes two input terminals and two output terminals;
   (c) an output network connecting said output terminals and including two parallel paths;
   (d) one of said parallel paths including in series said third winding means, one of the two windings of said second winding means, and a diode;
   (e) the other of said parallel paths including said fourth winding means, the second of said two windings in said second winding means, and a second diode poled oppositely to said first diode.

7. Electrical measuring apparatus as defined in claim 1, in which:
   (a) said bridge circuit includes two input terminals and two output terminals;
   (b) an output network connecting said output terminals and including two paths between said output terminals, each of said two paths including at least one diode, with the diode in one path poled oppositely to the diode in the other path; and
   (c) said third winding means being connected in one of said paths and the fourth winding means being connected in the other of said paths.

8. Electrical measuring apparatus as defined in claim 7, in which each of said paths includes only said winding means and a single diode.

9. Electrical measuring apparatus as defined in claim 1, in which:
   (a) said bridge circuit includes two input terminals and two output terminal means;
   (b) one of said output terminal means includes a resistor connecting two output terminal elements; and
   (c) said bridge circuit also includes an output terminal network including:
      (1) said second winding means,
      (2) two branches connecting one terminal of said second winding means respectively to one of the output terminal elements and to the other of said output terminal means, each of said branches including a diode, said diodes having their polarities opposed; and
      (3) two branches connecting the other terminal of the second winding means respectively to the other of the output terminal elements and to said other output terminal means, each of said branches including a diode, said diodes having their polarities opposed to each other.

10. Electrical measuring apparatus as defined in claim 1, in which:
    (a) said bridge circuit includes two input terminals and two output terminals; and
    (b) an output network connecting said output terminals and including:
       (1) a first conductive path between the output terminals comprising said third winding means and a first diode in series;
       (2) a second conductive path between the output terminals including said fourth winding means and a second diode in series with its polarity opposed to that of the first diode;

(3) a third conductive path between the output terminals including said second winding means and third and fourth diodes in series between the opposite terminals of said second winding means and said output terminals; and (4) a fourth conductive path between the output terminals including said second winding means and fifth and sixth diodes connected between opposite terminals of said second winding means and said output terminals, said fifth and sixth diodes being poled oppositely to said third and fourth diodes with respect to said output terminals.

11. Electrical measuring apparatus as defined in claim 1, in which:

(a) said bridge circuit includes two input terminals and two output terminals;

(b) two parallel paths between said output terminals, each said path including at least one diode, the diodes in said two paths being oppositely poled; and (c) said second winding means including two windings, each said path including one of said two windings.

12. Electrical measuring apparatus as defined in claim 1, in which:

(a) the bridge circuit includes two input terminals;

(b) said output network includes fifth and sixth winding means and means for energizing said fifth and sixth winding means only in response to unbalance of the bridge circuit beyond a predetermined point;

(c) said fifth and sixth winding means being located respectively on the second and third stator poles.

13. Electrical measuring apparatus as defined in claim 12, including:

(a) means directly connecting one terminal of said fifth winding means to a terminal of said fourth winding means;

(b) threshold potential responsive means connecting the other terminal of said fifth winding means to the other terminal of said fourth winding means;

(c) means directly connecting one terminal of said sixth winding means to a terminal of said third winding means; and (d) threshold potential responsive means connecting the other terminal of the sixth winding means to the other terminal of the third winding means.

14. Electrical measuring apparatus as defined in claim 12, in which said poles are 120° apart and the pointer means is swung through an angle of substantially 300° between opposite conditions of unbalance in the bridge circuit.

15. Electrical measuring apparatus, comprising:

(a) indicator means including a relatively movable scale means and pointer means;

(b) driving means for the indicator means including a rotor having at least one pole and a cooperating stator having at least three circumferentially spaced poles;

(c) a network controlling said driving means including:

(1) a bridge circuit including variable means operable to unbalance the bridge in either of two opposed senses;

(2) said bridge circuit including:

(A) a pair of input terminals connectable to a source of unidirectional electrical energy;

(B) a pair of output terminals having equal potentials when the bridge circuit is balanced;

(3) first winding means on a first one of the three stator poles and connected between said bridge input terminals;

(4) second winding means on said first stator pole;

(5) means, including diode means, connecting said second winding means between said output terminals and effective in either sense of bridge unbalance to energize said second winding means to produce a magnetic field opposing that of the first winding means;

(6) third and fourth winding means on the second and third of the three stator poles; and (7) means, including diode means, connecting said third and fourth winding means between said output terminals and effective in one sense of unbalance of the bridge to energize one of said third and fourth winding means and in the other sense of unbalance of the bridge to energize the other of said third and fourth winding means.

References Cited

UNITED STATES PATENTS

| | | | |
|---|---|---|---|
| 1,783,851 | 12/1930 | McCoy | 324—140 |
| 1,990,782 | 2/1935 | Greibach | 324—119 |
| 2,114,865 | 4/1938 | Traver | 324—119 XR |
| 2,910,650 | 10/1959 | Boddy | 324—133 |
| 3,310,739 | 3/1967 | Medlar | 324—119 XR |

GERARD R. STRECKER, Primary Examiner

U.S. Cl. X.R.

324—62, 119